（12) United States Patent
Wertheimer et al.

(10) Patent No.: US 8,949,197 B2
(45) Date of Patent: Feb. 3, 2015

(54) VIRTUAL FULL BACKUPS

(75) Inventors: Steven Wertheimer, Kentfield, CA (US); Muthu Olagappan, San Ramon, CA (US); Raymond Guzman, Amherst, NH (US); William Fisher, Concord, MA (US); Anand Beldalker, Banglore (IN); Venky Nagaraja Rao, Belmont, CA (US); Chris Plakyda, Londonderry, NH (US); Debjyoti Roy, Banglore (IN); Senad Dizdar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 675 days.

(21) Appl. No.: 13/286,106

(22) Filed: Oct. 31, 2011

(65) Prior Publication Data

US 2013/0110783 A1    May 2, 2013

(51) Int. Cl.
*G06F 17/30* (2006.01)
*G06F 11/14* (2006.01)

(52) U.S. Cl.
CPC .......... *G06F 11/14* (2013.01); *G06F 17/30575* (2013.01)
USPC ........... 707/678; 707/644; 707/654; 707/655; 707/675; 707/686

(58) Field of Classification Search
CPC ................................................. G06F 17/30575
See application file for complete search history.

(56) References Cited

U.S. PATENT DOCUMENTS

| | | | |
|---|---|---|---|
| 6,654,771 B1 * | 11/2003 | Parham et al. ........................ | 1/1 |
| 7,330,997 B1 | 2/2008 | Odom | |
| 7,676,510 B1 | 3/2010 | Karinta | |
| 8,112,661 B1 | 2/2012 | La France et al. | |
| 2001/0034737 A1 | 10/2001 | Cane et al. | |
| 2004/0167898 A1 | 8/2004 | Margolus et al. | |
| 2004/0260973 A1 | 12/2004 | Michelman | |
| 2005/0038836 A1 | 2/2005 | Wang | |
| 2005/0193236 A1 | 9/2005 | Stager et al. | |
| 2006/0282630 A1 | 12/2006 | Hochberg et al. | |
| 2007/0055833 A1 * | 3/2007 | Vu et al. ......................... | 711/162 |
| 2007/0103984 A1 | 5/2007 | Kavuri et al. | |
| 2007/0130232 A1 | 6/2007 | Therrien et al. | |
| 2007/0136381 A1 | 6/2007 | Maxwell et al. | |
| 2007/0239949 A1 | 10/2007 | Childs et al. | |

(Continued)

OTHER PUBLICATIONS

International Searching Authority, "Search Report" in application No. PCT/US2012/062622, dated May 10, 2013, 11 pages.

(Continued)

*Primary Examiner* — Mohammad S Rostami
(74) *Attorney, Agent, or Firm* — Hickman Palermo Truong Becker Bingham Wong LLP

(57) ABSTRACT

According to embodiments described herein, a backup server maintains backup data for a set of data, which includes data for a first block and a second block. Backup data for the first and second block include backup data for a plurality of versions of the first and second block. A distinct watermark is stored for each version of the first block and each version of the second block. In response to a request to perform a restoration operation on the set of data, a particular version of the first block and a particular version of the second block are selected to use in the restoration operation by comparing a restoration target with the watermarks of the version of the first block and second block. The selected version of the first block has a different watermark than the selected version of the second block.

20 Claims, 5 Drawing Sheets

(56) References Cited

U.S. PATENT DOCUMENTS

| | | |
|---|---|---|
| 2008/0034004 A1 | 2/2008 | Cisler et al. |
| 2008/0281883 A1 | 11/2008 | Cannon et al. |
| 2008/0307175 A1 | 12/2008 | Hart et al. |
| 2009/0276588 A1 | 11/2009 | Murase |
| 2011/0093672 A1 | 4/2011 | Gokhale et al. |
| 2013/0024423 A1 | 1/2013 | Doshi et al. |
| 2013/0024426 A1 | 1/2013 | Flowers et al. |

OTHER PUBLICATIONS

Current Claims in application No. PCT/US2012/062622, dated May 2013.

* cited by examiner

VIRTUAL FULL BACKUPS

CROSS-REFERENCE TO RELATED APPLICATIONS; BENEFIT CLAIM

This application is related to application Ser. No. 13/286,070, filed Oct. 31, 2011 entitled "Cooperative Storage Management," the entire contents of which is hereby incorporated by reference as if fully set forth herein.

FIELD OF THE INVENTION

The present invention relates generally to backing up data and, more specifically, to providing virtual full backups.

BACKGROUND

Data storage devices are subject to data loss from a variety of causes, such as disk failure, unintentional deletion, malicious software attacks, or natural disaster. A common practice to guard against data loss is to create backup copies of important data and store them at a remote storage location. In the event of data loss or corruption, the backup copies are used to restore the lost or corrupted data to a previous state.

In some cases, backup storage systems maintain multiple backup data sets for one or more client systems. For example, a client system may perform periodic backups of its data, thereby creating a backup data set at regularly scheduled intervals. Accordingly, at each interval, the client system sends, to a backup server, a backup data set that includes a copy of each data file that is being backed up. The backup server stores each backup data set as it arrives, and frees up space for new backup data by deleting older backup data sets.

Various strategies exist for managing and storing backup data. One approach involves taking regular full backups. In this approach, the backup server stores a complete set of data at each backup interval. A full backup set includes a copy of every data file on the client system, whether the data file has changed or not relative to any previously-created backup sets. This approach is inefficient because most blocks in most data files do not change from one backup operation to the next. Therefore, storing multiple full backup sets results in a great amount of data duplication and, consequently, a greater consumption of storage space.

An alternative approach to backing up data, which is more efficient than always making full backups, involves storing incremental backup data. An incremental backup is a backup of every file which has changed since the last backup. According to this approach, a full backup set is initially stored on the backup server. After that, incremental backups are generated and stored at backup intervals. Incremental backups consume less storage than full backups by reducing or eliminating redundant backup storage of unchanged data.

In order to identify the data that has changed from one backup set to the next, the backup server typically uses a hashing algorithm. Specifically, the client system sends a full data set to the backup server, regardless of whether data files within the set have changed since the last backup. The backup server hashes each chunk of the data as it arrives and compares the hash value produced by the chunk to the hash value produced by the same chunk in the most recent prior backup operation. If the hash values for a chunk match the previous hash values for the same chunk, then the backup server discards the chunk. Otherwise, the backup server stores the chunk as part of the current incremental backup. To facilitate the hash comparisons, the backup server may use an index of previously-generated hash values. The chunks for which hash values are generated may vary from implementation to implementation. For example, some backup servers may generate hash values on a file-by-file basis.

There are multiple disadvantages to hash-based approaches for identifying and storing incremental data. First, hashing algorithms may result in collisions. Collisions occur when the hashing algorithm generates the same hash value for two distinct pieces of data. If the hash value generated for a changed chunk is the same as the hash value produced by the same chunk prior to the change, then the backup server may mistakenly discard the changed chunk as redundant, resulting in a corrupted backup data set.

Another disadvantage of hashing is that hashing is relatively resource intensive. The backup server typically needs to hash a very large data set to determine which data has changed. Furthermore, the backup server needs to store and query a large index of hash values to identify redundant data. To perform the hashing process in real-time as the data arrives from a client system requires a great amount of processing power and I/O resources from the backup server, particularly when the data sets sent from the client system are large.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for providing virtual full backups for one or more client systems in a manner that allows for more efficient usage of backup resources. In particular, techniques are provided in which a backup server provides incremental backups without needing to hash large data sets to identify incremental changes between data sets.

According to embodiments described herein, a backup server stores and maintains a plurality of blocks to provide backup for one or more client systems. In one embodiment, the backup server maintains one or more versions for each block of backup data. Each distinct version of a particular block may belong to a different backup data set. To distinguish between the distinct versions of a block, the backup server also stores, indexes, and/or otherwise maintains a set of watermarks for each block.

In an embodiment, when a client system needs to restore data, the client system issues a request that specifies a restoration target to the backup server. In response to the request, the backup server retrieves the blocks necessary to restore data to the client system. To determine which version of a block the backup server should use to restore data to the client system, the backup server compares the restoration target with the watermarks associated with the blocks. The backup server selects the appropriate version of each block based on the comparison and provides backup to the client system using the selected version of each block.

According to other embodiments described herein, the backup server performs de-duplication of data to further reduce the storage requirements of backing up the one or more client systems. For example, the backup server may de-duplicate data across multiple client systems by sharing backup blocks for data that are common to multiple client systems. In another example, the backup server may de-duplicate backup data across different versions of the same block by storing only backup data within a more recent version of a block that has changed since a previous version of the block.

In other embodiments, the invention encompasses a computer apparatus and a non-transitory computer-readable medium configured to carry out the foregoing steps.

Structural Overview

Figure 1:
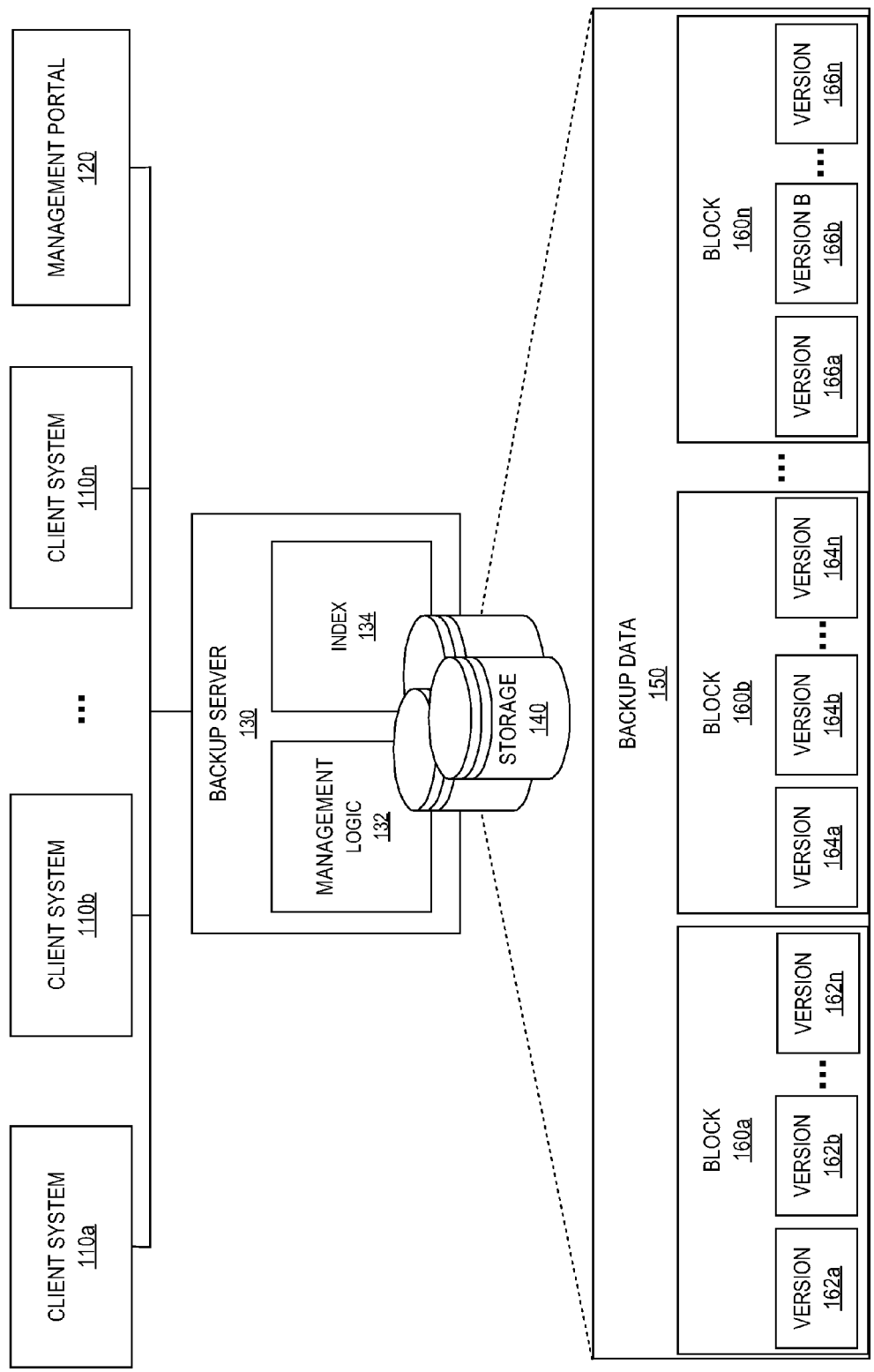
FIG. 1 is a block diagram of a system in which backup storage for one or more clients is managed by a storage system in accordance with an embodiment.

FIG. 1 is a block diagram of a system in which backup storage for one or more clients is managed by a storage system in accordance with an embodiment. Referring to FIG. 1, system 100 includes client systems 110a to 110n, which each store a set of data. Client systems 110a to 110n include one or more client systems that are communicatively coupled to backup server 130. In an example embodiment, client systems 110a to 110n are network hosts that implement the Internet Protocol (IP) and are connected to backup server 130 via a Local Area Network (LAN), a Wide Area Network (WAN), and/or the Internet. Accordingly, client systems 110a to 110n send data, including backup data, to backup server 130 using communication protocol(s) of the IP suite, such as the Hypertext Transfer Protocol (HTTP).

Client systems 110a to 110n are configured to send backups, including incremental backups, to backup server 130. The backup data may be sent in a continuous, timing-based, or event-based manner. For example, a client system may send backup data to backup server 130 whenever there is a change to a data file, at periodically scheduled intervals, or in response to a request from backup server 130.

In an embodiment, client systems 110a to 110n are configured to store datafiles, where each datafile comprises a set of one or more data blocks. Each of client systems 110a to 110n may be configured to execute a database management system that stores and manages data blocks. In an example embodiment, each block corresponds to a specific number of bytes of physical database space on disk for a client system. In another embodiment, client systems 110a to 110n are configured to manage metadata, such as a watermark and file number, for each block. The metadata associated with a block may be included in the block itself, such as in a block header, or maintained separately from the block.

Management portal 120 is software, or a combination of hardware and software, that enables a user to configure management parameters for backups of client systems 110a to 110n. Management portal 120 may execute on one or more of client systems 110a to 110n, backup server 130, or a separate network host device that is communicatively coupled to backup server 130. In an embodiment, management portal 120 is configured to allow a user, such as an administrator, to log onto backup server 130, to create new management parameters for client systems 110a to 110n, and to change and/or delete existing management parameters for client systems 110a to 110n. For example, the user may specify and/or change the data repository model, the backup rotation scheme, and the frequency with which the backup server 130 should store backups for each client system.

Backup server 130 is a storage server configured to receive and index backup data from client systems 110a to 110n. Backup server 130 includes management logic 132 which manages backups for client systems 110a to 110n. In one embodiment management logic 132 is configured to manage the backup data according to management parameters. For example, management logic 132 may determine how to store, retrieve, and/or delete backup data based on the management parameters. The management parameters may be specified by a user or may be pre-configured.

Backup server 130 includes index 134, which indexes the backup data received from client systems 110a to 110n. In an embodiment, index 134 is configured to allow backup server 130 to identify the physical location of every block for a given datafile. In another embodiment, index 134 is configured to index a set of one or more watermarks for each block. The set of one or more watermarks allow backup server 130 to identify different versions of a block, as described in further detail below.

Backup server 130 includes storage 140, which comprises one or more storage locations in which to store backup data for clients 110a to 110n. Storage 140 may be implemented in a variety of ways. As an example, each storage location of storage 140 can be provisioned as regular filesystems, Automatic Storage Management (ASM) disk groups, and/or web-services storage such as Amazon Simple Storage Service (S3). Backup server 130 may optionally store redundant copies of disk backup data to provide increased data protection. For instance, storage 140 may include a Redundant Array of Independent Disks (RAID) storage system where two or more copies of a backup data blocks are stored, each copy on a different disk.

Storage 140 includes backup data 150, which comprises backup data from backups received from one or more of client systems 110a to 110n. In one embodiment, backup data 150 stored by backup server 130 includes blocks 160a to 160n. Backup server 130 also stores backup data for one or more versions of each block, as illustrated by blocks 162a to 162n, 164a to 164n and 166a to 166n of FIG. 2.

Figure 2:
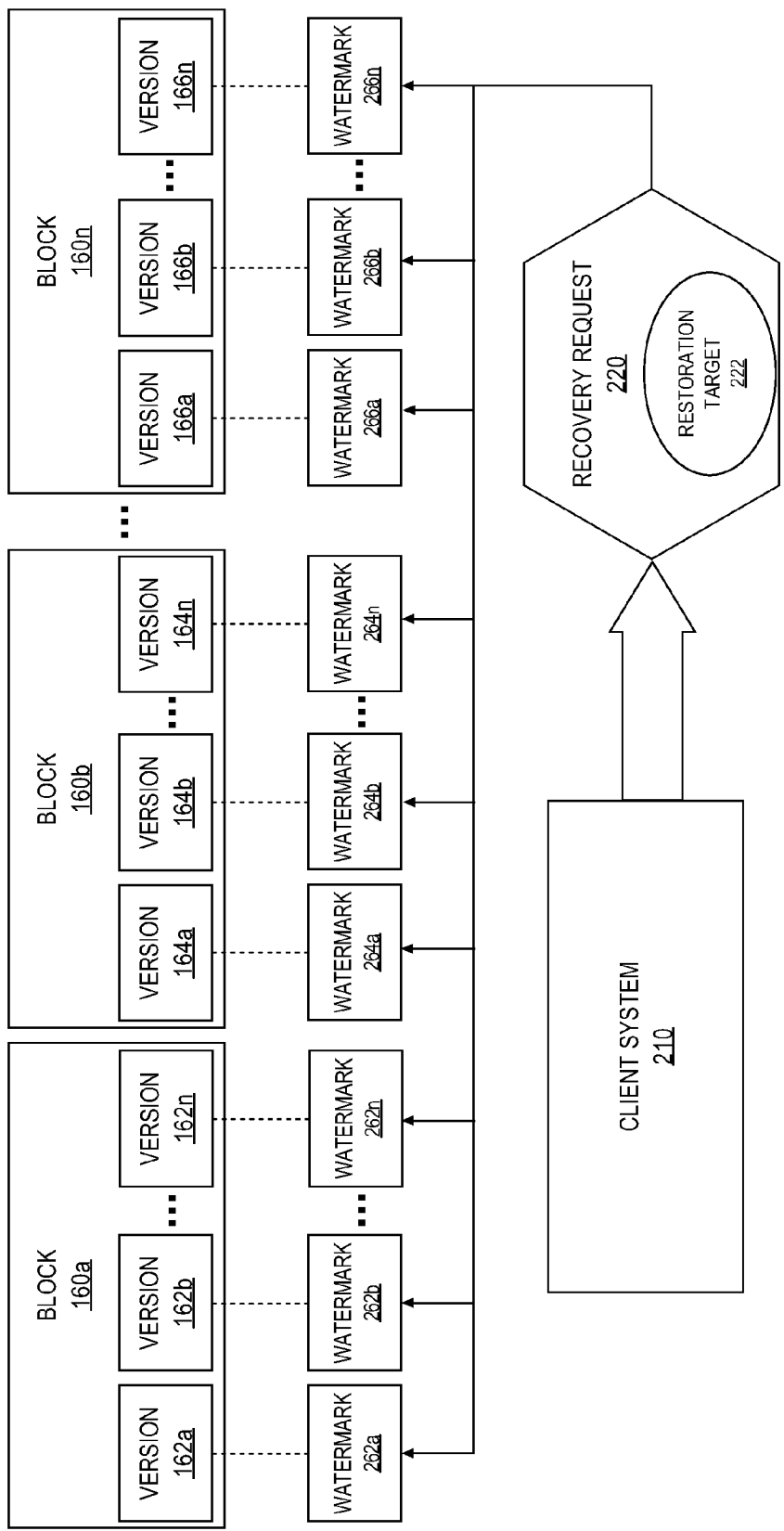
FIG. 2 is a block diagram of a recovery request operation in accordance with an embodiment.

Although FIG. 2 uses "n" to reference a number of client systems, blocks, and block versions, it should be understood that "n" signifies that one or more of these elements may exist, and should not be read to imply that the same number of these elements necessarily exist in the system. For example, the number of client systems, blocks, and versions may differ at any given moment, and the number of versions within each block may differ from one block to the next.

Watermarks

As used herein, the term "watermark" refers to a value, associated with data, that is changed when the associated data is changed. For example, one form of watermark is the version number of a file. As the file is updated, the version number is incremented. As another example, within a database system the System Commit Numbers (SCNs) that are assigned to changes made by the database server may serve as watermarks for the blocks to which the changes were made.

By comparing the watermarks of two copies of an item to each other, it is possible to determine whether the two copies are the same version of the item, or different versions of the item. Depending on the nature of the watermarks used, the comparison may also indicate which version of the item is more recent than the other version. For example, in a database system, a copy of block X that is associated with an SCN of 50 is more recent than a copy of block X that is associated with an SCN of 35.

In situations where multiple entities are independently assigning watermarks to data, a comparison of the watermarks does not necessarily indicate the sequence in which changes were made. For example, a first client may assign an SCN of 50 to a change made by the first client before a second client assigns an SCN of 35 to a change made by the second client.

Sending Incremental Backups Based on Block Changes

In order to identify the data that needs to be backed up in an incremental backup operation, watermarks are maintained by the client system for each block in a set of data. The watermarks that are maintained for each block allow the client system and/or the backup server 130 to track changes to a given block. If a particular block has changed since a previous backup, then the client system sends the block to the backup server 130 in the next incremental backup. By sending to the backup server 130 only blocks that have changed, instead of the entire set of data, the client system and backup server 130 may significantly reduce the amount of I/O resource usage required to perform a backup.

In one embodiment, watermarks are used to identify different versions of a block. When a block changes on the client system, the watermark for the block is also changed. Thus, each distinct watermark identifies a different version of the block. The client system and the backup server 130 may use the watermark information associated with the blocks to determine which blocks in a set of data have changed without hashing the entire set of data.

In an example embodiment, a client system maintains a set of data comprising a plurality of blocks, where each block is associated with a watermark. The client system performs an initial full backup by sending, to the backup server 130, a backup data set that includes the plurality of blocks and their associated watermarks. Following the initial full backup, all subsequent backups may be performed on an incremental basis. For each incremental backup, the client system determines which data blocks have an updated watermark, and sends to the backup server 130 only those blocks that have an updated watermark.

A variety of techniques may be used to determine whether the watermark for a block has been updated relative to a most-recently performed backup. For example, in one embodiment, the client system keeps track of the watermarks of blocks that are sent to the backup server 130. During each new incremental backup, the client reads the current watermark for each data block and compares it with the watermark of that same data block that was sent during the last backup of that data block. If a watermark for a particular block has changed since the most recent backup of that data block, then the client system determines that the block has been updated. Accordingly, the client system sends, to the backup server 130, copies of the blocks whose watermarks have changed since the previous backup as part of an incremental backup set.

In some client systems, the value of a watermark reflects the order in which the watermark was assigned. This may be true, for example, in a client system that uses SCNs as watermarks. In such systems, it is possible to determine whether a block has been changed by comparing the current watermark of the block to the highest watermark sent with the most recent backup operation. If the current watermark of any block is higher than the highest watermark of the most recent backup operation, then the block must have been updated more recently than the most recent backup operation. Consequently, the block will have to be included in the next incremental backup operation.

According to one embodiment, the incremental backup set also includes the updated watermarks for each of these blocks.

In order to determine whether the watermark for a particular data block has changed, the client system may locally maintain watermark information associated with the previous backup or may fetch this information from the backup server 130. For example, when the client system performs a full or incremental backup, the client system may store watermark information in a local database to identify the most recent version of a data block that has been backed up. When the client system needs to perform an incremental backup, the client system retrieves the watermark information from its database and uses it to determine whether any block changes have been made. Alternatively, the client system can fetch watermark information from the backup server 130, which maintains watermark information for each backup it receives. For example, the client system may issue a request for the watermark information to the backup server 130. In response to the client system's request, the backup server 130 returns the most current watermark information for the client system. The client system uses the watermark information returned by the backup server 130 to determine which blocks have been locally changed and need to be sent as part of the next incremental backup.

In one embodiment, the client system determines which blocks have changed by reading the current watermark for each data block for a data file and comparing it to a checkpoint watermark that was included in a previous backup. The checkpoint watermark is the highest value watermark that was included in the previous backup. If the current watermark is greater than or equal to the checkpoint watermark, then the client system copies the data block and sends it to the backup server 130 as part of an incremental backup.

Receiving Incremental Backups Based on Block Changes

The backup server 130 is configured to receive full and incremental backups from one or more client systems 110a to 110n. In one embodiment, incremental backups include only those blocks from the set of data that have changed since the last backup. In other words, data blocks that have not changed since the last backup are not included in the incremental backup. In an embodiment, each backup also includes a watermark for each block that is included in the backup. The watermark identifies the version of the block that is being sent.

In response to receiving backups from a client system, the backup server 130 indexes and stores the backup data. In one embodiment, the index 134 includes an index entry for every block that has been received in either a full or incremental backup. The index entry for a given block specifies the physical location of the block on the storage used by the backup server 130. The index 134 allows the backup server 130 to find the complete set of blocks that belonged to a datafile as of the time an incremental backup was taken, regardless of how many different backups contribute blocks to the datafile.

In one embodiment, the backup server 130 also indexes and stores each watermark that it receives. Thus, if different versions of the same data block have been backed up, then index 134 may include a separate entry for each version of the data block, where the entry of each version includes the watermark associated with the version. Alternatively, a single entry may cover all versions of a data block, where the single entry has a vector of watermarks and a vector of corresponding physical locations. The backup server 130 uses the indexed watermarks to locate different versions of a data block and to determine the particular version of a block that should be used in a restoration operation. Techniques for responding to recovery requests are described further below.

Block Pools

In one embodiment, the backup server 130 maintains a block pool for each datafile that is being backed up. When an initial full backup is performed, the backup server 130 stores a full copy of each block for a datafile in the datafile's block pool. As the backup server 130 receives incremental backups, the backup server 130 stores backup data for the updated block versions in the datafile's block pool. The backup data may be a full copy of the version of the block or incremental data for the version of the block. Techniques for de-duplicating between blocks are described further below.

As new incremental backups arrive for files that are randomly updated, the block pool will grow increasingly fragmented, and restore performance of more recent backups may suffer because their blocks are not stored in contiguous order in the block pool. To alleviate these effects, the backup server 130 may periodically re-write its backups to disk into a more contiguous block order.

Restoring Data Based on Block Changes

When a client system needs to restore a set of data, it submits a recovery request to the backup server 130. According to one embodiment, the recovery request identifies a "restoration target". The term "restoration target" is used herein to refer to any criteria that indicates which data is to be restored. For example, the client system may identify the restoration target by specifying a date and time. With a date and time as a restoration target, the backup server 130 knows that the client desires a copy of the all data from that client as it existed at the specified date and time. That is, the restoration should include all changes that were committed to the data at and before the specified time, and no changes that were made to the data after the specified time. Alternatively, the client system may identify a restoration target by specifying a particular backup set that the client system would like to use to restore the set of data. The set of data associated with the recovery request may be an entire backup set or any portion of a backup set, such as a particular datafile.

In response to the recovery request, the backup server 130 determines which blocks should be used to restore the set of data. According to one embodiment, the backup server 130 compares the restoration target with watermark information that it has stored for each block to determine which version of a block meets the restoration target. For example, in an embodiment that uses SCNs as watermarks, backup server 130 may determine the highest SCN that should be included in the restoration target. That SCN is referred to herein as the not-to-exceed SCN. In general, the version of each block that is selected for inclusion in the restore operation is the version that is closest to but does not exceed the not-to-exceed SCN.

In response to the comparison, the backup server 130 selects a version of each of a plurality of blocks to use in the restoration operation. The versions that are selected may be selected from different backup sets. For example, for a restoration target of yesterday, the backup server 130 may select a version of a first block that was received in an incremental backup taken the previous week, and a version of a second block that was received in an incremental backup taken two weeks ago.

FIG. 2 is a block diagram of a recovery request operation in accordance with an embodiment. Referring to FIG. 2, as illustrated by watermarks 262*a* to 262*n*, 264*a* to 264*n* and 266*a* to 266*n*, backup server 130 stores and indexes a watermark for each block version included in backup data 150. Client system 210 issues recovery request 220 to backup server 130. Recovery request 220 specifies restoration target 222. To determine which blocks backup server 130 should use to restore the set of data, backup server 130 compares restoration target 222 with watermarks 262*a* to 262*n*, 264*a* to 264*n* and 266*a* to 266*n*.

More specifically, to determine which version of block 160*a* should be returned, backup server 130 compares restoration target 222 with watermarks 262*a* to 262*n*. Backup server 130 selects the version of block 160*a* based on which watermark meets restoration target 222. Similarly, backup server 130 selects the version of block 160*b* based on watermarks 264*a* to 264*n* and block 160*n* based on watermarks 266*a* to 266*n*.

To determine which version of a block meets the restoration target, the backup server 130 determines, based on the watermarks associated with the block, the most recent version of the block that does not exceed the restoration target. For example, if the recovery request specifies a restoration target of a particular date and time, the backup server 130 determines the most recent version of the block that was backed up on or before the particular date and time. The backup server 130 selects this version of the block to use in the restoration of the set of data.

Figure 4:
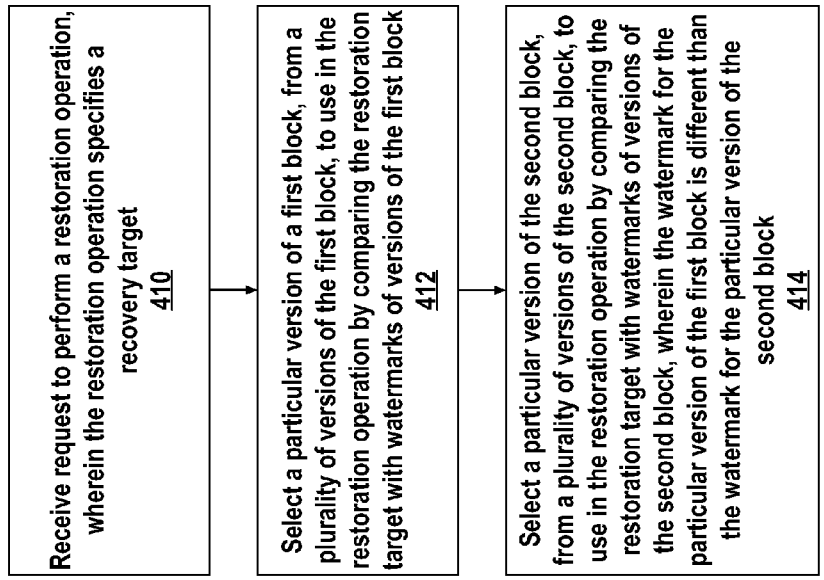
FIG. 4 is a flowchart illustrating a method for restoring a set of data in accordance with an embodiment.

The watermarks that meet the restoration target may be the same or may differ from one block to the next. FIG. 4 illustrates a method in which the backup server 130 selects blocks with different watermarks to use in a restoration operation. In step 410, a request is received to perform a restoration operation on a set of data. The request is associated with a particular restoration target. In step 412, a particular version of a first block is selected, from the plurality of versions of the first block, to use in the restoration operation by comparing the restoration target with the watermarks of versions of the first block. In step 414, a particular version of the second block is selected, from the plurality of versions of the second block, to use in the restoration operation by comparing the restoration target with the watermarks of versions of the second block. The particular version of the first block is associated with a different watermark than the particular version of the second block.

In one embodiment, the backup server 130 performs the restoration operation by reconstructing the set of data as it existed on the client system at a particular point in time that is identified by the recovery request. The backup server 130 reconstructs the set of data using the blocks that it selects to use in the restoration operation. For example, the backup server 130 may reconstruct a particular datafile by placing each block in contiguous order. The reconstructed set of data is then returned to the client system to restore the set of data on the client system.

Using System Change Numbers as Watermarks

In one embodiment, the client system maintains system change numbers for each data block. The system change number (SCN) is a logical value that identifies when a change to a data block was made relative to other changes within the client system. For example, the client system may maintain a counter that increments in response to receiving, executing, and/or committing a command to change a block. The SCN that the client system associates with a particular block is the value of the counter when the most recent change was made to the particular block. Thus, the SCN acts as a logical timestamp that identifies the version of a particular block and the time that the block was changed relative to other changes within the client system.

In one embodiment, the client system uses the highest SCN that was sent in the previous backup as a checkpoint to determine which blocks to include in an incremental backup. If the SCN of a data block is lower than the checkpoint SCN, then the client system determines that the particular version of the data block has been sent in a previous backup. Conversely, if the particular version of the data block is greater than or equal to the checkpoint SCN, then the client system determines that the block has changed since the previous backup was sent, and the particular version of the data block is included in the next incremental backup.

In one embodiment, the backup server 130 determines which data blocks should be used in a restoration operation based on the highest SCN associated with the restoration target. Specifically, when a recovery request is received, the backup server 130 determines a checkpoint SCN associated with the restoration target specified in the recovery request. The checkpoint SCN is the highest SCN value that the backup server 130 received as part of a backup set identified by the restoration target. For example, assume a client system specifies that it would like to use a particular backup set taken the previous week to restore a set of data. The backup server 130 determines the highest SCN that was received with that particular backup set and uses this SCN as the checkpoint for the recovery operation.

To determine which blocks should be used in the restoration operation, the backup server 130 compares the checkpoint SCN with the SCNs associated with blocks stored by the backup server 130 for the client. Based on the comparison, the backup server 130 selects blocks to use in the restoration operation. In one embodiment, the backup server 130 selects blocks that have an SCN less than or equal to the checkpoint SCN. By selecting only blocks that are less than or equal to the checkpoint SCN, the recover server ensures that only blocks that were included with the particular backup set identified in the recovery request or in a backup set received by the backup server 130 before the particular backup are used in the restoration operation. If there are multiple SCNs for a data block that are less than or equal to the checkpoint SCN, the backup server 130 selects the highest SCN that is less than or equal to the checkpoint SCN. Accordingly, the backup server 130 selects the most recent version of the data block that is not in advance of the checkpoint.

Figure 3:
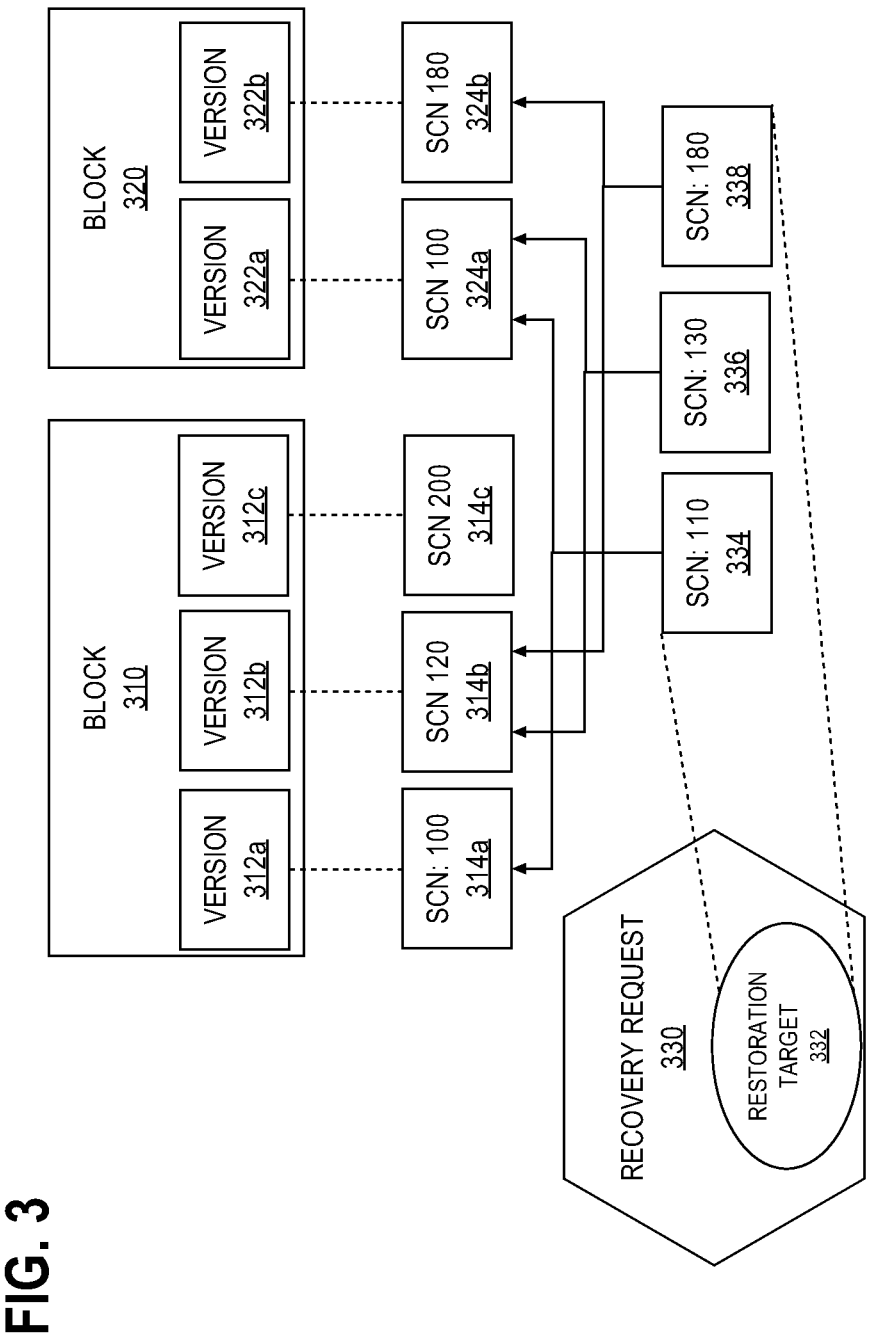
FIG. 3 is a block diagram of a recovery request operation based on system change numbers in accordance with an embodiment.

FIG. 3 is a block diagram of a recovery request operation based on system change numbers in accordance with an embodiment. As illustrated, the backup server 130 stores backup data for two blocks: block 310 and block 320. The backup data stored for block 310 includes backup data for three versions of the block: version 312*a*, version 312*b*, and version 312*c*. The backup data stored for block 320 includes two versions: version 322*a* and 322*b*. The backup server 130 associates a watermark with each block version. In the example illustrated, for block 310, SCN 100 (block 314*a*) is associated with version 312*a*, SCN 120 (block 314*b*) with version 312*b*, and SCN 200 (block 314*c*) with version 312*c*. For block 320, the backup server 130 associates SCN 100 (block 324*a*) with version 314*a* and SCN 180 (block 324*b*) with version 314*b*.

The backup server 130 receives recovery request 330, which specifies restoration target 332. The backup server 130 determines the highest watermark associated with the restoration target. Three different scenarios are illustrated in FIG. 3. One in which the highest SCN is 110 (block 334), one in which the highest SCN is 130 (block 336), and one in which the highest SCN is 180 (block 338). The backup server 130 compares the highest value watermark to the watermarks of each block version and selects the greatest SCN number that does not exceed the highest value watermark. Thus, in the case where the restoration target is associated with a highest SCN of 110 (block 334), the backup server 130 selects version 312*a* of block 310 and version 322*a* of block 320, which both have an SCN value of 100. In the case where the highest SCN is 130 (block 336), the backup server 130 selects version 312*b* of block 310, which has an SCN value of 120 and version 322*a* of block 320, which has an SCN value of 100. In the case where the highest SCN is 180 (block 338), the backup server 130 selects version 312*b* of block 310, which has an SCN value of 120 and version 322*b* of block 320, which has an SCN value of 180. The backup server 130 returns the selected versions of the data blocks to the client system as part of the restoration operation.

De-Duplication Across Multiple Clients

In one embodiment, the backup server 130 acts as a backup repository for a plurality of client systems. In other words, the backup server 130 receives backups from the plurality of clients and can perform a restoration operation for any of the plurality of clients. The backup server 130 maintains metadata in its index 134 indicating which blocks belong to which clients. If client issues a recovery request, the backup server 130 queries the index 134 to determine which blocks should be used to restore data to the client.

Frequently, organizations will replicate data across multiple client systems for a variety of reasons. In such a scenario, multiple client systems will likely store duplicate versions of a data block. Storing separate backups for each of these client systems is inefficient because it results in unnecessary duplication of data and consumption of storage resources.

To reduce storage space requirements for backing up multiple client systems, the backup server 130 may perform inter-database de-duplication. In one embodiment, the backup server 130 stores a single data block to provide backup for duplicate versions of the data block from different client systems. Thus, the backup server 130 may use the same data block version to perform a restoration operation on any client system that shares the data block, without regard to which client system sent that particular data block version to the backup server 130.

In one embodiment, the backup server 130 detects duplicate blocks based on hashing. For example, the backup server 130 may apply a hashing algorithm to each data block that it receives as part of a backup. Applying the hashing algorithm generates a hash value for the data block. The backup server 130 compares the hash value against an index of hash values that the backup server 130 has already seen. If the hash value is not recognized, then the backup server 130 stores a backup copy of the block on disk. If the hash value is recognized, then the backup server 130 determines that a copy received in the backup is a duplicate of some other block version that has already been backed up to disk. In response to such a determination, the backup server 130 does not store another copy of the block to disk. Instead, the backup server 130 identifies the copy of the block that is already stored on disk and generates metadata to associate a new client system (i.e., the client system that sent the duplicate) with the data block. Thus, a single block version may be associated with multiple client systems. Although hashing is used to identify duplicate data in this instance, the backup server 130 does not have to hash an entire backup data set. Because the incremental backup set only includes blocks that have changed from a previous version, the backup server 130 is hashing a much smaller data set.

In one embodiment, determining which blocks are duplicates is based on a file number and SCN associated with the block. For example, if the header of a block includes the same file number and SCN as another block that the backup server 130 has already received, then the block is likely a duplicate. The backup server 130 may use this header data in conjunction with hashing to augment its determination that a particular version of a block is a duplicate. The metadata stored in each block header may be used to effectively eliminate the risk of hash collisions.

In some instances, client systems that share backup data blocks may begin to diverge. For example, a client system may begin to make block changes that are not replicated to a duplicate block on a separate client system. In this case, as the data block starts to diverge, the backup server 130 will maintain distinct versions of the data block for each client system. However, the backup server 130 may continue to share the parent copy of the data block between the two client systems. In addition, the backup server 130 may restore a datafile using some versions of a data block that are shared and some versions of data block that are unique to the client.

De-Duplication within Data Blocks

The backup server 130 may also perform intra-block de-duplication for different versions of the same block. In one embodiment, the backup server 130 compares the block contents for each new incremental version of a given block and stores only the actual changed data.

For example, assume, for purposes of illustration, that a block contains eight kilobytes of data. If only ten bytes within a block change from one version to the next, then the backup server 130 can compare the versions of the block, and store only the ten bytes that have changed. Instead of storing sixteen kilobytes of data for the two separate versions of the block, the backup server 130 stores eight kilobytes for the first version of the block plus an additional ten bytes for the second version of the block. If the backup server 130 needs to use the second version of the block in a restoration operation, the backup server 130 reconstructs the version of the block by applying the eight kilobyte change to the previous version of the block.

In one embodiment, the backup server 130 may perform a direct memory comparison between two block versions to identify which data has changed. For example, the backup server 130 may compare, bit by bit, the data contained within the different block versions and mark the bits which differ between the two. After the comparison is complete, the backup server 130 stores those bits which differ between the two versions as backup data for the more recent version of the block.

In another embodiment, the backup server 130 divides the block version into multiple chunks, and hashes each chunk. The corresponding hash values can be compared with previously generated hash values for the same chunks to identify which data has changed. This process is similar to the hashing that occurs in the de-duplication across client systems, except the hash is used to identify differences within different versions of the same block and not to identify duplicate blocks. This differs from conventional hashing to identify incremental changes because the backup server 130 is hashing between different versions of a block in which there is a known change. Thus, the data set that is being hashed is much smaller and there is no risk of inadvertently omitting the changed block from backup storage due to collision.

In yet another embodiment, the backup server 130 identifies changes between block versions based on internal block metadata. Some database systems maintain metadata in block headers that logically identifies the rows and columns contained within the data block. The backup server 130 compares this metadata to metadata in the previous version of the block to identify which particular row and/or column has changed. In response to the determination, the backup server 130 stores backup data only for the particular row and/or column that has changed.

Purging Obsolete Backup Data

Due to the physical limitations of storage devices, no system can store an infinite amount of backup data. At some point, older backup data may need to be purged to make space for newer backup data. Accordingly, in some embodiments, the backup server 130 purges backup data from storage 140 to free up space for new backup data. The techniques and frequency with which the backup server 130 purges backup data from storage 140 may vary from implementation to implementation.

In one embodiment, the backup server 130 determines which blocks to purge based on the watermark data that it maintains. For example, the backup server 130 may use the index 134 or direct data inspections to compare watermarks and determine which versions of a block have become obsolete.

In one embodiment, the backup server 130 establishes a checkpoint watermark to identify obsolete blocks. The checkpoint watermark is based on the oldest backup set that is valid. For instance, if backup server 130 is configured to store three months of backup data, the oldest valid backup set would be the oldest backup set taken within the past three months. The backup server 130 determines the highest SCN received as part of the oldest valid backup set and establishes this SCN as the checkpoint. To determine which blocks are obsolete, the backup server 130 searches the index 134 or performs direct data inspections to identify, for each block, the version with the highest SCN that does not exceed the checkpoint. Any version of a block that has an SCN lower than this highest SCN is identified as obsolete. The backup server 130 may delete these block versions upon identification or may mark these block versions as obsolete, for example, by storing metadata in the block header.

In one embodiment the blocks are fixed size and the obsolete blocks can be overwritten as a way of reclaiming space. In another embodiment, the blocks are individually compressed and placed into small datafiles. To reclaim space backup server 130 rewrites non-obsolete versions of a block into new small datafiles omitting the obsolete blocks. Once the new datafile is written, the older datafiles that include duplicate and obsolete blocks can be deleted.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
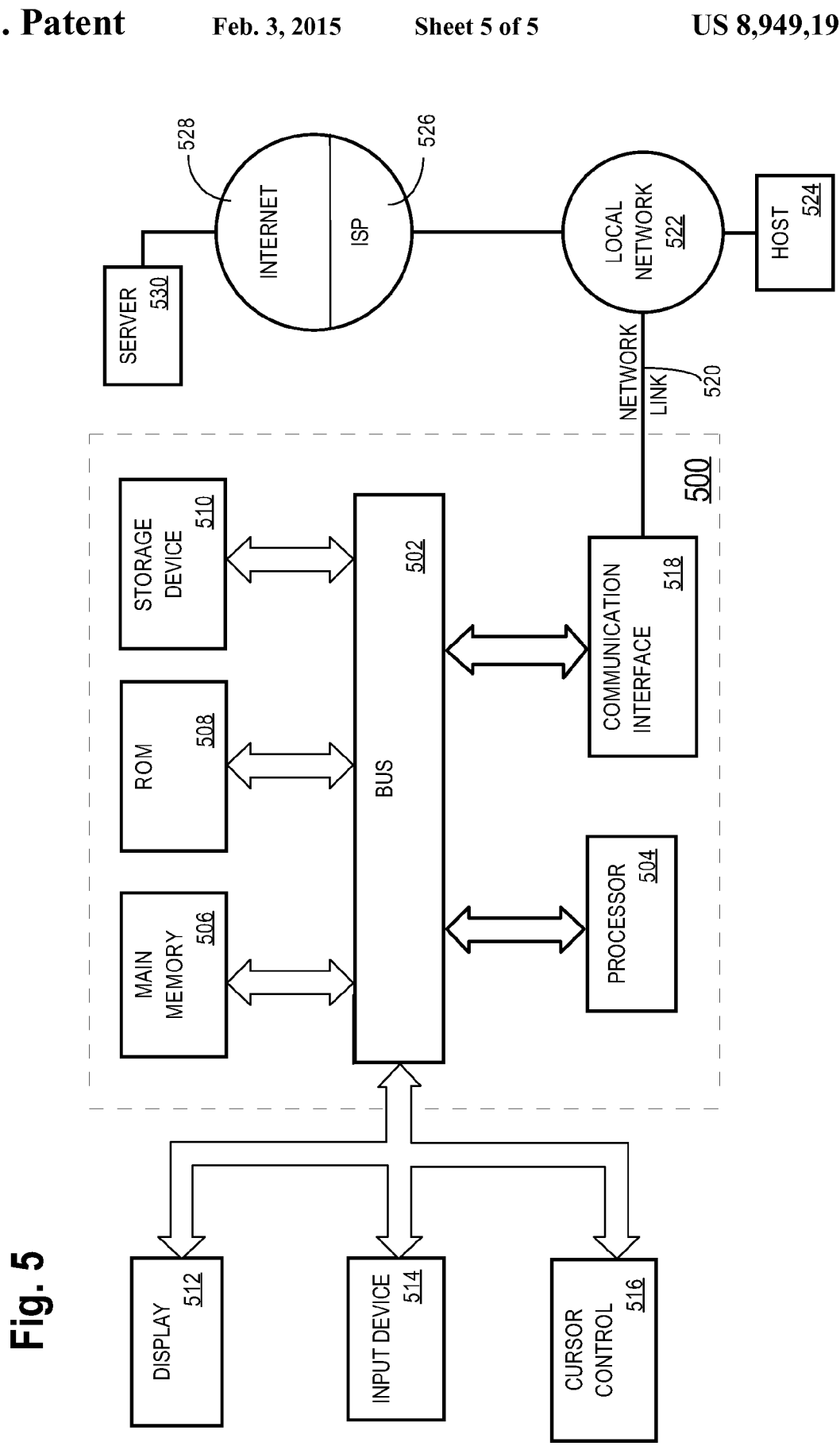
FIG. 5 is a block diagram of a computer system upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine.

According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining, by a backup server comprising one or more processors, backup data for a set of data;
   wherein the set of data includes data for a plurality of blocks that include a first block and a second block;
   wherein the backup data for the first block includes backup data for a plurality of versions of the first block;
   storing a distinct watermark for each version of the plurality of versions of the first block;
   wherein the backup data for the second block includes backup data for a plurality of versions of the second block;
   storing a distinct watermark for each version of the plurality of versions of the second block;
   receiving a request to perform a restoration operation on the set of data, wherein the request specifies a restoration target;
   in response to the request, performing the steps of:
      selecting a particular version of the first block, from the plurality of versions of the first block, to use in the restoration operation by comparing the restoration target with the watermarks of the versions of the first block; and
      selecting a particular version of the second block, from the plurality of versions of the second block, to use in the restoration operation by comparing the restoration target with the watermarks of the versions of the second block;
      wherein the particular version of the first block is associated with a different watermark than the particular version of the second block.

2. The method of claim 1, further comprising performing the restoration operation, wherein performing the restoration operation comprises reconstructing the set of data using at least the particular version of the first block and the particular version of the second block.

3. The method of claim 1,
   wherein the particular version of the first block was received by the backup server in a first backup set;
   wherein the particular version of the second block was received by the backup server in a second backup set;
   wherein the first backup set was received by the backup server at a different time than the second backup set.

4. The method of claim 1, wherein each distinct watermark is a system change number (SCN) that corresponds to a time that a change was made to a block relative to other changes to the plurality of blocks.

5. The method of claim 4, wherein the method further comprises:
   determining a checkpoint based on the restoration target;
   wherein the checkpoint is a SCN of a highest value that was received in a backup data set associated with the restoration target;
   wherein selecting a particular version of the first block, from the plurality of versions of the first block, to use in the restoration operation by comparing the restoration target with the watermarks of the versions of the first block comprises:
      comparing the checkpoint to the watermarks of the versions of the first block;
      selecting the particular version of the first block based on which version has a highest SCN that is less than or equal to the checkpoint;
   wherein selecting a particular version of the first block, from the plurality of versions of the second block, to use in the restoration operation by comparing the restoration target with the watermarks of the versions of the second block comprises:
      comparing the checkpoint to the watermarks of the versions of the second block;
      selecting the particular version of the second block based on which version has a highest SCN that is less than or equal to the checkpoint.

6. The method of claim 1,
   wherein the set of data is for a first client system of a plurality of client systems:
   wherein the set of data includes a first version of the first block;
   wherein the backup server stores backup data for a second set of data for a second client system of the plurality of client systems;
   the method further comprising:
      receiving, by the backup server, a second version of the first block from the second client system;
      determining that the second version of the first block is a duplicate version of the first version of the first block;
      providing backup to the second client system for the second version of the block using the first version of the block.

7. The method of claim 6, further comprising:
   receiving, by the backup server, a third version of the first block from the second client system;
   determining that the third version of the first block is not yet stored by the backup server;
   storing backup data for the third version of the first block;
   wherein the backup server uses the third version of the first block to provide backup data to the second client system, but not to the first client system;
   wherein the backup server uses the first version of the first block to provide backup data to both the first client system and the second client system.

8. The method of claim 1, further comprising:
receiving, by the backup server as part of an incremental backup, an updated version of the first block;
comparing the updated version of the first block with a previous version of the first block to determine which data has changed between the updated version of the first block and the previous version of the first block;
storing, as backup data for the updated version of the first block, only the data that has changed between the updated version of the first block and the previous version of the first block.

9. The method of claim 8, wherein the backup server identifies the data that has changed between the updated version and the previous version of the first block based, at least in part, on hashing the updated version of the first block.

10. The method of claim 8, wherein the backup server identifies the data that has changed between the updated version and the previous version of the first block based, at least in part, on metadata associated with the first block.

11. A non-transitory computer-readable medium storing instruction, which, when executed by one or more processors, cause one or more computing devices to perform operations comprising:
maintaining, by a backup server comprising one or more processors, backup data for a set of data;
wherein the set of data includes data for a plurality of blocks that include a first block and a second block;
wherein the backup data for the first block includes backup data for a plurality of versions of the first block;
storing a distinct watermark for each version of the plurality of versions of the first block;
wherein the backup data for the second block includes backup data for a plurality of versions of the second block;
storing a distinct watermark for each version of the plurality of versions of the second block;
receiving a request to perform a restoration operation on the set of data, wherein the request specifies a restoration target;
in response to the request, performing operations comprising:
selecting a particular version of the first block, from the plurality of versions of the first block, to use in the restoration operation by comparing the restoration target with the watermarks of the versions of the first block;
selecting a particular version of the second block, from the plurality of versions of the second block, to use in the restoration operation by comparing the restoration target with the watermarks of the versions of the second block;
wherein the particular version of the first block is associated with a different watermark than the particular version of the second block.

12. The non-transitory computer-readable medium of claim 11, further comprising instructions for performing the restoration operation, wherein performing the restoration operation comprises reconstructing the set of data using at least the particular version of the first block and the particular version of the second block.

13. The non-transitory computer-readable medium of claim 11,
wherein the particular version of the first block was received by the backup server in a first backup set;
wherein the particular version of the second block was received by the backup server in a second backup set;
wherein the first backup set was received by the backup server at a different time than the second backup set.

14. The non-transitory computer-readable medium of claim 11, wherein each distinct watermark is a system change number (SCN) that corresponds to a time that a change was made to a block relative to other changes to the plurality of blocks.

15. The non-transitory computer-readable medium of claim 14, wherein the non-transitory computer-readable medium further comprises instructions for:
determining a checkpoint based on the restoration target;
wherein the checkpoint is a SCN of a highest value that was received in a backup data set associated with the restoration target;
wherein selecting a particular version of the first block, from the plurality of versions of the first block, to use in the restoration operation by comparing the restoration target with the watermarks of the versions of the first block comprises:
comparing the checkpoint to the watermarks of the versions of the first block;
selecting the particular version of the first block based on which version has a highest SCN that is less than or equal to the checkpoint;
wherein selecting a particular version of the first block, from the plurality of versions of the second block, to use in the restoration operation by comparing the restoration target with the watermarks of the versions of the second block comprises:
comparing the checkpoint to the watermarks of the versions of the second block;
selecting the particular version of the second block based on which version has a highest SCN that is less than or equal to the checkpoint.

16. The non-transitory computer-readable medium of claim 11,
wherein the set of data is for a first client system of a plurality of client systems:
wherein the set of data includes a first version of the first block;
wherein the backup server stores backup data for a second set of data for a second client system of the plurality of client systems;
the non-transitory computer-readable medium further comprising instructions for:
receiving, by the backup server, a second version of the first block from the second client system;
determining that the second version of the first block is a duplicate version of the first version of the block;
providing backup to the second client system for the second version of the block using the first version of the block.

17. The non-transitory computer-readable medium of claim 16, further comprising instructions for:
receiving, by the backup server, a third version of the first block from the second client system;
determining that the third version of the first block is not yet stored by the backup server;
storing backup data for the third version of the first block;
wherein the backup server uses the third version of the first block to provide backup data to the second client system, but not to the first client system;
wherein the backup server uses the first version of the first block to provide backup data to both the first client system and the second client system.

18. The non-transitory computer-readable medium of claim 11, further comprising instructions for:

receiving, by the backup server as part of an incremental backup, an updated version of the first block;

comparing the updated version of the first block with a previous version of the first block to determine which data has changed between the updated version of the first block and the previous version of the first block;

storing, as backup data for the updated version of the first block, only the data that has changed between the updated version of the first block and the previous version of the first block.

19. The non-transitory computer-readable medium of claim 18, wherein the backup server identifies the data that has changed between the updated version and the previous version of the first block based, at least in part, on hashing the updated version of the first block.

20. The non-transitory computer-readable medium of claim 18, wherein the backup server identifies the data that has changed between the updated version and the previous version of the first block based, at least in part, on metadata associated with the first block.

* * * * *